United States Patent
Schwertner

(10) Patent No.: US 12,228,054 B2
(45) Date of Patent: Feb. 18, 2025

(54) DEVICE FOR RECEIVING, STORING AND RELEASING THERMAL ENERGY

(71) Applicant: OOXOJ GmbH, Zug (CH)

(72) Inventor: Heiko Schwertner, Ebikon (CH)

(73) Assignee: OOXOJ GmbH, Zug (CH)

( * ) Notice: Subject to any disclaimer, the term of this patent is extended or adjusted under 35 U.S.C. 154(b) by 0 days.

(21) Appl. No.: 18/027,273

(22) PCT Filed: Sep. 21, 2020

(86) PCT No.: PCT/EP2020/076328
§ 371 (c)(1),
(2) Date: Mar. 20, 2023

(87) PCT Pub. No.: WO2022/058035
PCT Pub. Date: Mar. 24, 2022

(65) Prior Publication Data
US 2023/0323794 A1    Oct. 12, 2023

(51) Int. Cl.
*F01K 3/10*    (2006.01)
*F24H 7/02*    (2022.01)
*F28D 20/00*    (2006.01)

(52) U.S. Cl.
CPC ............... *F01K 3/10* (2013.01); *F24H 7/02* (2013.01); *F28D 20/003* (2013.01); *F28D 20/0056* (2013.01)

(58) Field of Classification Search
CPC . F01K 3/10; F24H 7/02; F28D 20/003; F28D 20/0056
See application file for complete search history.

(56) References Cited

U.S. PATENT DOCUMENTS

2017/0276435 A1*  9/2017 Papadopoulos ........... F01K 3/00
2018/0114890 A1*  4/2018 Chauvin .................. G21D 5/02
(Continued)

FOREIGN PATENT DOCUMENTS

DE    10 2011 017 311 A1    10/2012
DE    102013114159 A1 *   10/2014   ............ F01K 13/00
WO    2014/063810 A2    5/2014
(Continued)

OTHER PUBLICATIONS

English Translation DE-102013114159-A1 (Year: 2014).*
(Continued)

*Primary Examiner* — Shafiq Mian
(74) *Attorney, Agent, or Firm* — Finch & Maloney PLLC

(57) ABSTRACT

A device for receiving, storing and releasing thermal energy, the device comprising a thermally insulated enclosure defining a cavity; at least one thermal energy storage material disposed within said cavity; at least one energy source configured for charging said thermal energy storage material with thermal energy; and a thermal energy converter configured for receiving thermal energy from said thermal energy storage material; wherein said thermally insulated enclosure comprises an inner wall, an outer wall and a substantially gas-tight interior void delimited by the inner wall and the outer wall, and wherein the outer wall comprises at least one flow regulator in fluid communication with the interior void and configured to supply and remove working fluids to and from the inner void.

11 Claims, 4 Drawing Sheets

(56) References Cited

U.S. PATENT DOCUMENTS

2018/0219267 A1     8/2018  Martin et al.
2018/0231316 A1*    8/2018  Watremetz ............... C09K 5/14

FOREIGN PATENT DOCUMENTS

WO      2016/050366 A1    4/2016
WO      2018/201193 A1    11/2018

OTHER PUBLICATIONS

International Search Report Corresponding to PCT/EP2020/076328 mailed Jun. 10, 2021.
Written Opinion Corresponding to PCT/EP2020/076328 mailed Jun. 10, 2021.

* cited by examiner

DEVICE FOR RECEIVING, STORING AND RELEASING THERMAL ENERGY

This application is a National Stage completion of PCT/EP2020/076328 filed Sep. 21, 2020.

FIELD OF THE INVENTION

The present invention relates to a device for receiving, storing and releasing thermal energy, a method of propelling a vehicle with electric and/or kinetic energy, and the use of a device as disclosed herein for the propulsion of a vehicle.

BACKGROUND OF THE INVENTION

Heat accumulators known from the state of the art are generally charged, i.e. heated, by flame or solar energy and store the absorbed heat until further use. To generate electricity, water vapor generated by passing water through or along a heat accumulator can be transferred to a turbine generator via a piping system. However, such systems are currently only used in stationary, mostly large-scale plants. Mobile applications such as the propulsion of passenger cars or trucks as well as domestic applications are, however, not feasible using smaller plants working on the same principle since the amount of electricity generated by cogeneration is so small that it has to be stored temporarily in order to be used again at a later date, i.e. separately from the electricity generation. In the current state of the art, this intermediate storage is mostly done by batteries or hydrogen.

Hydrogen-powered vehicles use hydrogen as an on-board fuel for propulsion. The power plants for hydrogen-powered vehicles convert the chemical energy of hydrogen into mechanical or electrical energy and generally fall into one of two categories. The first category includes internal combustion hydrogen engines (H2ICE), which burn hydrogen in the combustion chamber to generate mechanical energy to power the vehicle. The second includes fuel cells that convert hydrogen with oxygen to produce electricity to power an electric motor to propel the vehicle.

Today's hydrogen-powered vehicles suffer from a number of limitations that limit their appeal to a typical motorist. The amount of hydrogen required to provide an acceptable range for the hydrogen-powered vehicle requires a very large tank that takes up a large portion of the space, reducing the size of the vehicle's trunk and/or passenger compartment. Furthermore, even if a relatively large tank is provided, the vehicle has a range that is hardly acceptable to today's customers.

US 2018/219267 A1 discloses a motor vehicle comprising an electrolysis device which decomposes water into hydrogen and oxygen, a battery for storing electrical energy, and a hydrogen-powered energy source providing motive power for the motor vehicle. The hydrogen-powered energy source may be a fuel cell or a hydrogen internal combustion engine.

Vehicles of this type have the disadvantage, however, that a lot of electrical energy is needed to produce fuel, i.e. oxygen and hydrogen. Furthermore, such a high voltage battery represents a significant capital cost, consumes a substantial amount of space on the vehicle and adds substantial weight which reduces the overall performance of the vehicle.

SUMMARY OF THE INVENTION

It is thus an object of the present invention to remedy these and other disadvantages of the state of the art and in particular to provide a device for receiving, storing and releasing thermal energy which enables the fast generation of electrical energy from thermal energy and/or the conversion of thermal energy stored in a thermal energy storage material into kinetic energy upon demand. Further objects of the present invention are to provide a method for propelling a vehicle with electric and/or kinetic energy, in particular generated by using a device as disclosed herein, and to propose the use of a device as disclosed herein for the propulsion of a vehicle.

The object is achieved by a device, a method, and the use of a device pursuant to the independent claims. Advantageous embodiments are subject of the dependent claims.

According to the present invention, the device for receiving, storing and releasing thermal energy comprises a thermally insulated enclosure defining a cavity, at least one thermal energy storage material disposed within said cavity, at least one energy source configured for charging said thermal energy storage material with thermal energy, and a thermal energy converter configured for receiving thermal energy from said thermal energy storage material. The thermally insulated enclosure comprises an inner wall, an outer wall and a substantially gas-tight interior void delimited by the inner wall and the outer wall. In other words, the thermally insulated enclosure is a double-walled insulation vessel that minimizes heat transfer between its contents, i.e. the thermal energy storage material, and the vessel's surroundings. The outer wall of the thermally insulated enclosure comprises at least one flow regulator which is in fluid communication with the interior void and is configured to supply and remove at least one working fluid to and from the inner void.

It has now been surprisingly found that the thermal energy released from the thermally insulated enclosure can be used for the temperature control of buildings, batteries, the preheating of motors or liquids and/or the generation of electrical power, for example. In particular it has been surprisingly found that devices according to the invention are capable of providing enough electricity quickly and on demand per unit of time that this electricity can be used directly to drive vehicles and no intermediate storage of electricity is necessary. Due to the ready scalability of devices according to the invention, a broad range of applications is conceivable with the devices disclosed herein. The high temperature insulation used with these devices enables storing of thermal energy in the long term by keeping heat losses very low and can also be used in combination with passive insulation elements. The thermal insulation disclosed herein can be configured to allow for the contactless loading of a thermal energy storage material enclosed in it as well as for the controlled and targeted release of thermal energy, as will be described in detail later. The use of thermal energy storage materials has the advantage that the number of charge/discharge cycles is virtually unlimited. Also, the energy density storable in such materials is significantly higher compared to conventional batteries, which has a positive effect on the total weight and the running time of devices operated with a device according to the invention.

For the purpose of this document, the term "vehicle" includes any machine that transports people or cargo including in particular motor vehicles and aircraft.

The term "thermal energy converter" means any device capable of converting the thermal energy emitted directly or indirectly form the thermal energy storage material into electrical energy and/or kinetic energy. Examples of thermal energy converters for the conversion of thermal energy into electricity include thermoelectric generators (TEGs), Peltier elements, upconverter for solar cells, dynamos, and/or electrostatic generators. Examples of thermal energy converters for the conversion of thermal energy into kinetic energy include piston engines, Schukey engines, Stirling engines, quasiturbines, and/or turbojets. It is understood that multiple thermal energy converters can be used with the invention disclosed herein in combination, simultaneously and/or alternately. Furthermore, certain thermal energy converters can simultaneously or alternately convert thermal energy into electric and/or kinetic energy.

The term "thermal energy storage material" means any type of heat accumulators, in particular static heat accumulators, phase change materials (PCMs), thermochemical heat accumulators, passive heat storage, and combinations thereof. Phase change materials are also referred to as latent heat storage (LHS) materials.

The term "working fluid" means any liquid or gas, in particular water, high-temperature oils, helium or air.

The term "flow regulator" means any device that is configured to enable or inhibit the flow of working fluid through said device in an essentially complete and/or partial manner.

The present invention thus comprises several aspects:

First, the contactless supply of thermal energy into a thermal energy storage material, i.e. the charging of the device.

Second, a multi-layer, high temperature insulation enclosure for containing the thermal energy storage material. This aspect further includes the shape, e.g. a nozzle-like shape, of the thermally insulated enclosure containing the thermal energy storage material as well as flow regulators which are suitable for controlling the release of thermal energy stored in the thermal energy storage material and/or the release of pressurized working fluid, such as valves, gate valves, multi-stage valves, pumps, particularly piezo pumps, and combinations thereof.

Third, an arrangement of a thermal energy storage material and a thermal energy converter for the conversion of thermal energy into electrical energy.

Fourth, an arrangement of a thermal energy storage material and a thermal energy converter for the conversion of thermal energy into kinetic energy.

Particularly with regard to aspects three and four, the shape and structural elements of the thermally insulated enclosure containing the thermal energy storage material is such that the thermal energy released by the thermal energy storage material can be supplied to a thermal energy converter directly and/or via one or more heated working fluids. It is to be understood that multiple thermal energy converters can be used simultaneously or alternately with the present invention and that the thermal energy released from the thermal energy storage material can be converted into both electrical and kinetic energy at the same time or alternately.

The various aspects of the present invention will be described in more detail later.

Preferably, the outer wall of the device disclosed herein comprises a first flow regulator and a second flow regulator. The first flow regulator is configured to control the supply of working fluids from the inner void to and from the thermal energy converter. The second flow regulator is configured to supply and remove working fluids to and from the inner void.

By arranging at least two flow regulators as described, it is possible to supply a working fluid to a thermal energy converter via the inner void of the thermally insulated enclosure. By controlling the flow regulators accordingly, working fluid can be fed into the inner void. The heated working fluid can be fed to a thermal energy converter through the first flow regulator due to the pressure increase associated with the heating of the working fluid. In addition or alternatively, the heated working fluid can be displaced by new working fluid which is fed into the inner void through the second flow regulator. Moreover, the two flow regulators make it possible to evacuate the inner void, e.g. by applying an external vacuum to the second flow regulator, in order to transport cooled working fluid from the thermal energy converter back into the inner void and, if necessary, out of the inner void. It is also conceivable that the working fluid remains in a closed circuit and is thus protected from external influences such as contamination or undesired changes.

In the context of the present specification, the term "vacuum" means that the pressure applied to the inner void is lower than the pressure in the inner void. In other words, the term "vacuum" means underpressure.

In a preferred embodiment of the device disclosed herein, said first and second flow regulators be arranged on opposite sides of the thermal energy storage material. Increasing the travel distance of the working fluid through the thermally insulated enclosure, and thus the dwell time of the working fluid, concomitantly increases the heating of the working fluid by the thermal energy storage material.

Preferably, the inner wall of the device disclosed herein comprises at least one flow regulator which is in fluid communication with the cavity comprising the thermal energy storage material. This flow regulator is configured to supply and remove at least one working fluid to and from the cavity.

This allows for the working fluid to be heated not only indirectly in the inner void but also allows working fluid to come into direct contact with the thermal energy storage material. This allows the speed of heating of the working fluid to be further increased.

In a preferred embodiment of the device disclosed herein, the thermally insulated enclosure of the device disclosed herein, in particular the outer wall, is configured as a nozzle with at least one nozzle outlet opening. The working fluid which is heated in the inner void and/or in the cavity leaves the nozzle outlet opening as a jet directed onto the thermal energy converter.

Preferably, the thermally insulated enclosure is connected pressure-tight to the thermal energy converter in order to avoid pressure losses in the system and to increase the effect of the fluid escaping from the nozzle outlets. The latter is particularly important if the thermal energy of the working fluid or any fission products derived therefrom is to be converted into kinetic energy in the thermal energy converter.

Preferably, the flow regulators of the device disclosed herein are valves, gate valves, multi-stage valves, or pumps, particularly piezo pumps. It is understood that the flow regulators of the device disclosed herein can all be selected from one type or from combinations of the listed flow regulators.

The use of piezo pumps is advantageous because they can withstand very high temperatures. The use of multi-stage valves is advantageous as they allow the different zones to be opened or closed in steps. This allows different working processes to be controlled without the need for a multitude of valves, thereby reducing the number of openings and increasing the insulating performance of the thermally insulating enclosure.

In a preferred embodiment of the device disclosed herein, the inner wall of the device disclosed herein is configured for increasing the contact area between the thermal energy storage material and the inner wall and/or between the inner wall and the working fluid. Increasing the contact area has the advantage that the heat transfer between the thermal energy storage material and the working fluid is improved, thus enabling faster heating of working fluids.

In a preferred embodiment of the device disclosed herein, the inner wall comprises protuberances on the side of the inner wall facing the thermal energy storage material and/or on the side of the inner wall facing the working fluid. This allows the contact area to be particularly enlarged.

The structure of the thermally insulated enclosure is preferably designed such that it comprises several parts that can be connected to each other via connection means, e.g. screws, in order to be able to replace or exchange the thermal energy storage material if necessary.

Preferably, the thermally insulated enclosure of the device disclosed herein comprises two parts. The cavity that is formed when the two parts are mated together is configured to contain the thermal energy storage material, wherein the thermal energy storage material can be replaced by taking the first part and the second part apart.

It is conceivable according to the invention that the first part and the second part are two half pieces of the thermally insulated enclosure. It is also conceivable that the two parts are of different sizes, e.g. one of the parts is in the form of a scraper lid or a screw-hook closure which can be engaged with a correspondingly shaped area of the second part. Alternatively, it would also be conceivable that one of the two parts is a lid which can be moved, in particular pushed or swiveled, over an opening in the other of the two parts in order to cover the opening completely or partially. In this case, the part comprising the opening essentially forms the housing for the thermal energy storage material.

The provision of a thermally insulated enclosure comprising multiple parts makes it particularly easy to replace or exchange the thermal energy storage material contained therein. With two parts, the amount of work remains manageable.

In the case of a multi-part design of the thermally insulated enclosure, it is preferred that at least one of the parts is movable and configured to form a thermal valve. The thermal valve substantially prevents the transfer of thermal energy from the thermal storage material to the thermal energy converter in a first position and enables the transfer of thermal energy from the thermal storage material to the thermal energy converter in a second position. Preferably, the at least one movable part forming the thermal valve is continuously adjustable between the first position and the second position such that the amount of thermal energy supplied to the thermal energy converter and/or the output of the thermal energy converter is continuously adjustable. This enables a particularly simple and low-loss power control.

In a preferred embodiment of the device disclosed herein, the thermal energy storage material includes one or more phase change material.

A phase change material is a substance which releases/absorbs sufficient energy at phase transition to provide heat/cooling. Generally the transition will be from one of the first two fundamental states of matter, i.e. solid and liquid, to the other. By melting and solidifying at the phase change temperature, a phase change material is capable of storing and releasing comparatively large amounts of energy. Heat is absorbed or released when the material changes from solid to liquid and vice versa or when the internal structure of the material changes. Thus, the phase transition may also be between non-classical states of matter, such as the conformity of crystals, where the material goes from conforming to one crystalline structure to conforming to another, which may be a higher or lower energy state. Examples of suitable phase change materials to be used with the invention disclosed herein include but are not limited to water, zinc, sodium chloride and silicon.

In a preferred embodiment of the device disclosed herein, the thermal energy storage material comprises or essentially consists of one or more static heat storage material which is preferably selected from the group of metals, minerals and/or ceramics. More preferably, said one or more static heat storage material is silicon, iron, lead and/or copper.

According to the invention, it is also conceivable that the working fluid or working fluids used undergo chemical reactions, whereby at least one of the reaction products is subsequently supplied to and/or used by the thermal energy converter. By using water as the working fluid, hydrogen can be produced by means of thermochemical water splitting cycles in which hydrogen and oxygen are produced in different steps. Such two-stage water splitting catalytic cycles are typically based on metal oxide redox systems, wherein the first, endothermic step involves the thermal dissociation of metal oxides at high temperatures:

$$M_xO_y \rightarrow xM + \frac{y}{2}O_2 \tag{1}$$

The second, exothermic step is the hydrolysis of the resulting metals at moderate temperatures (below about 900K), forming molecular hydrogen and the corresponding metal oxides:

$$i.\ xM + yH_2O \rightarrow M_xO_y + yH_2 \tag{2}$$

In a preferred embodiment of the device disclosed herein, the thermal energy storage material consists of or comprises a catalyst for a chemical reaction of the working fluid, in particular for the dissociation of water into its constituent parts.

In particular, the use of zinc as the catalyst for the dissociation of water has the advantage that this material serves both as a catalyst for splitting water and as a thermal energy storage material. Without wishing to be bound by theory, it is assumed that water splitting takes place according to the following equations:

$$a.\ ZnO \rightarrow Zn + \tfrac{1}{2}O_2 \tag{3}$$

$$b.\ Zn + H_2O \rightarrow ZnO + H_2 \tag{4}$$

Zinc oxide is thermally decomposed into metallic zinc (reduction). The oxygen released during this process can either be captured or simply released into the atmosphere. In a second step, zinc is allowed to react with water, releasing hydrogen. In the process, zinc is transformed back into zinc oxide (oxidation), which can be used in a subsequent catalytic cycle. The hydrogen can either be used directly to produce electricity or processed to produce other fuels such as methanol. After energy use, hydrogen becomes water again.

In a preferred embodiment of the device disclosed herein, the thermal energy storage material consists of or comprises a catalyst for the production of synthetic fuels from water and carbon dioxide.

The first step in the production of such synthetic fuels, also known as E-fuels, is to heat the water to more than 800 degrees. The steam thus generated is split into hydrogen and oxygen by a suitable catalyst such as described herein above. In two further steps, the hydrogen reacts with carbon dioxide at high pressure and high temperature, e.g. at a catalytic reaction temperature of about 1000° C. This produces a liquid consisting of long-chain hydrocarbon compounds, which can be used for the propulsion of a vehicle in a combustion engine.

In a preferred embodiment of the device disclosed herein, the energy source comprises a laser and the thermally insulated enclosure comprises an optical system configured to pass and/or collimate and/or focus incoming laser light into the thermal energy storage material. In particular, the outer wall and the inner wall of the thermally insulated enclosure comprise an optical system arranged coaxially on the outer wall and the inner wall of the thermally insulated enclosure, wherein the optical system is configured to pass and/or collimate and/or focus incoming laser light into the thermal energy storage material.

The use of lasers as energy source for charging the thermal energy storage material has the advantage that lasers can be operated with very low voltages and with low amperage, for example 24 V and 0.5 A. The temperatures that can be generated can range from several 100° C. to several 1000° C. Solar cells, for example, can be used to operate the laser(s) used. Furthermore, lasers are scalable in size and power which makes them particularly suitable for a broad range of applications ranging from stationary applications, such as housing, industrial heating or supplementary distant heating, to mobile applications, such as vehicles. Another advantage of using lasers is that the thermal energy storage material can be charged with heat by light independent of the time of day and the weather.

The optical system can be a lens system, wherein the outer wall of the thermally insulated enclosure comprises a first lens and the inner wall of the thermally insulated enclosure comprises a second lens. The first lens and the second lens can be arranged coaxially on the respective outer and inner wall in order to allow for to allow the passage of light from the laser into the thermal energy storage material in an essentially direct way and without the need for additional optical elements such as mirrors.

In the simplest case, however, the optical system can only comprise, preferably consist of, two windows, wherein the outer wall of the thermally insulated enclosure comprises a first window and the inner wall of the thermally insulated enclosure comprises a second window and wherein the two windows are arranged coaxially on the respective outer and inner wall.

Suitable materials for the optical system have only a minimal absorption of the laser light at the respective wavelength emitted by the laser. Examples of material that are preferred for use with the present invention include quartz or sapphire.

In a preferred embodiment of the device disclosed herein, the energy source comprises an infrared generator. IR generators can be built in such a way that the thermal energy storage material can be heated over a large area and/or from several sides simultaneously.

In a preferred embodiment of the device disclosed herein, the energy source comprises an induction heating device with at least one induction coil. The induction coil is connected in a thermally conductive manner to the thermal energy storage material. Preferably, the induction coil is embedded at least partially in the thermal energy storage material.

In a preferred embodiment of the device disclosed herein, the energy source comprises an electrical resistance heating element, for example an immersion heater. The electrical resistance heating element is connected in a thermally conductive manner to the thermal energy storage material. Preferably, the electrical resistance heating element is embedded at least partially in the thermal energy storage material.

By embedding the induction coil and/or the electrical resistance heating element in the thermal energy material, the heating of the thermal energy storage material can be optimized.

In a preferred embodiment of the device discloses herein, at least a portion of the thermal energy delivered to the thermal energy converter is converted to electricity by the thermal energy converter. Preferably, the thermal energy converter is a Stirling engine, a thermoacoustic generator, or a thermoelectric generator, a peltier element, an upconverter for solar cells, a quasiturbine and/or a turbojet.

The present invention can also be used, in particular in the high temperature range, to produce hydrogen, which can then be used in an internal combustion engine or in a fuel cell.

In a preferred embodiment of the device disclosed herein, the thermal energy converter comprises a piston engine and/or a fuel cell. The piston engine and/or the fuel cell are operated substantially with oxygen and/or hydrogen obtained from water splitting using the thermal energy storage material, as previously described herein.

The use of hydrogen combustion engines is particularly preferred as such engines are very robust, have a long service life, low manufacturing costs, and have a high specific power density. In the commercial vehicle sector, the advantages such as range, short refueling times and cost efficiency are particularly evident and thought after.

In a preferred embodiment of the device disclosed herein, the device additionally comprises a heat recovery device configured for charging the thermal energy storage medium with thermal energy. This can further increase the overall efficiency of the inventive system.

In a preferred embodiment of the device disclosed herein, the thermal energy converter is a steam turbine or a piston engine operated substantially with the heated and/or pressurized working fluid provided by the thermal energy storage material. In this embodiment, the thermal energy storage material is preferably arranged within the thermal energy converter.

The object is further achieved by a method, preferably a method for use with a device s disclosed herein.

According to the present invention, the method comprises the steps of receiving, by a thermal energy storage material, thermal energy from an energy source; transferring the thermal energy from the thermal energy storage material to a thermal energy converter; and converting, by the thermal energy converter, the thermal energy into electrical energy and/or kinetic energy. The amount of electrical energy and/or kinetic energy generated per unit of time is sufficient to drive a vehicle. Furthermore, the electrical energy does not have to be stored temporarily for the purpose of driving the vehicle.

The thermal energy is optionally transferred to the thermal energy converter by a working fluid, which is heated by the thermal energy storage material. It goes without saying that the present invention also considers the heating of the working fluid via the inner wall of the housing, since the inner wall itself is in turn heated by the thermal energy storage material.

The method as disclosed herein has the advantage that it represents a robust and easy to perform procedure. The method is particularly advantageous since it is not required that the electrical energy generated is stored, which evades the need for large and heavy batteries.

The object is further achieved by the use of a device as described herein for the propulsion of a vehicle. Preferably, the device is operated with a method as disclosed herein.

The object is further achieved by a thermally insulated enclosure, in particular for a device as disclosed herein, comprising a first high-temperature insulation layer, for example of solid ceramic or flexible fiber ceramic, a vacuum insulation, and a second high-temperature insulation layer.

Of course it would also be conceivable, without departing from the spirit of the invention, that the thermally insulated enclosure merely features a single insulating layer. In this case, the at least one flow regulator would connect the cavity with the environment of the thermally insulated enclosure via said one layer. The thickness of the insulating layer and/or the material of the insulating layer would have to be chosen by a person skilled in the art to be sufficiently thick or to feature a sufficiently low coefficient of thermal conductivity in order to protect the thermal energy storage material from high heat losses.

According to the invention, the thermally insulated enclosure comprises an inner wall defining a cavity, an outer wall and a substantially gas-tight interior void delimited by the inner wall and the outer wall. The outer wall comprises at least one flow regulator in fluid communication with the interior void and configured to supply and remove a working fluid to and from the inner void.

Preferably, the inner wall and the outer wall are configured in such a way that a thermal energy storage material can either be actively moved in the thermally insulated enclosure or passively flowed through by a working fluid, as will be described in more detail further below.

Preferably, the outer wall comprises a first flow regulator and a second flow regulator. The first flow regulator and the second flow regulator are each configured to supply and remove working fluids to and from the inner void. It is preferred that said first and second flow regulators are arranged on opposite sides of the thermally insulated enclosure.

Preferably, the inner wall comprises at least one flow regulator in fluid communication with the cavity and configured to supply and remove working fluids to and from the cavity.

In a preferred embodiment of the thermally insulated enclosure disclosed herein, the thermally insulated enclosure comprises openings and/or chambers that allow, among other things, heat to be dissipated from the cavity and/or light to enter the interior of the combination thermal insulation.

Preferably, the thermally insulated enclosure, in particular the inner wall, is configured as a nozzle with at least one nozzle outlet opening. In this embodiment, a working fluid heated in the inner void and/or in the cavity can leave the nozzle outlet opening as a jet of working fluid.

Preferably, the flow regulators used with the thermally insulated enclosure disclosed herein are valves, gate valves, multi-stage valves, pumps, particularly piezo pumps, or combinations thereof.

Preferably, the inner wall comprises protuberances on the side of the inner wall facing the cavity and/or on the side of the inner wall facing the inner void.

Preferably, the thermally insulated enclosure comprises two parts. The cavity is formed when the two parts are mated together. In this embodiment, the cavity can be accessed by taking the first part and the second part apart.

Preferably, the thermally insulated enclosure comprises at least two parts, at least one of which is movable between a first position and a second position and configured to form a valve. In this embodiment, the valve substantially prevents access from outside the thermally insulated enclosure to the cavity in the first position enables access from outside the thermally insulated enclosure to the cavity in the second position. The at least one movable part forming the valve is preferably continuously adjustable between the first position and the second position.

Preferably, the thermally insulated enclosure comprises an optical system configured to pass and/or collimate and/or focus incoming light into the cavity. It is particularly preferred that the optical system is arranged coaxially on the outer wall and the inner wall of the thermally insulated enclosure.

A thermally insulated enclosure as described herein has the advantages set out above for a device comprising a thermal energy storage material enclosed in a thermally insulated enclose as described herein. With the thermally insulated enclosures disclosed herein, vacuum is used on the one hand to protect the contents of the cavity from heat loss and on the other hand to allow the inlet and outlet of liquids or gases. The insulations according to the invention are therefore active functional parts of a device comprising them.

The object is further achieved by an arrangement comprising at least one thermal energy storage material and at least one energy source configured for contactless charging of said thermal energy storage material with thermal energy.

Preferably, said at least one energy source configured for contactless charging of said thermal energy storage material is selected from a laser, an infrared generator, or an induction heating device.

The exemplary energy sources mentioned herein are all contactless and can be operated with both high and low voltages or currents. Contactless has the advantage that a thermal energy storage material can be completely insulated, which significantly extends its heat retention time. The energy sources are suitable for high temperature applications and also for low temperature applications and also for all types of thermal energy storage materials as described above. In addition, these energy sources have high efficiencies at low costs.

In particular, the object is achieved by an arrangement comprising a thermal energy storage material contained in a thermally insulated enclosure as disclosed herein, and at least one energy source configured for contactless charging of said thermal energy storage material with thermal energy.

The object is further achieved by an arrangement comprising at least one thermal energy storage material and at least one thermal energy converter, wherein at least a portion of the thermal energy stored in the thermal energy storage material and supplied to the thermal energy converter is converted to electricity and/or kinetic energy by the thermal energy converter.

Such an arrangement provides voltages and currents of sufficient type and quantity which can be used directly, i.e. without the necessity of intermediate storage, by a device comprising such an arrangement. However, it is possible that intermediate storage of generated electricity is performed when a surplus of electricity is generated.

The arrangement preferably comprises a shaping insulation layer, the inner and/or outer wall of which is designed in such a way that the heat stored in the thermal energy storage material is supplied to a thermal energy converter either directly from the thermal energy storage material or via a working fluid. The amount of electricity generated per time is so high in the system according to the invention that this electricity can be used to drive vehicles and no intermediate storage of electricity is necessary.

Preferably, the arrangement comprising a specifically shaped insulation for a thermal energy storage material and a thermal energy converter is used in high-temperature applications, especially at temperatures above 200° C.

Optionally, the arrangement can also be used together with a heat recovery device, e.g. like in a combined heat and power plant.

In particular, the thermal energy converter is a Stirling engine, a thermoacoustic generator, a thermoelectric generator, a piston engine, a fuel cell, a rotor power generator, a peltier element, an upconverter for solar cells, a Schukey engine, a quasiturbine and/or a turbojet. The combination of several or different types of generators is also conceivable of course, for example the combination of one or several thermoelectric modules (TEMs) and a Stirling engine generator.

In the case of a piston engine or pressurized air motor, a working fluid in an antechamber of the piston engine or pressurized air motor is heated, for example to over 1000° C. The antechamber represents a confined volume. Consequently, the pressure of the working fluid increases due to its increase in temperature and the pressurized working fluid can be released from the antechamber into the piston chamber, for example via a suitable valve. In the context of the present invention, the inner void and/or the cavity of a thermally insulated enclosure as described herein can represent such an antechamber to the piston chamber. An arrangement as disclosed herein can also be used for pulsed and/or continuous drive of turbines.

Preferably, the piston engine and/or fuel cell are operated substantially with oxygen and/or hydrogen obtained from water splitting using the thermal energy storage material, as described herein.

In particular, the object is achieved by an arrangement comprising at least one thermal energy storage material contained in a thermally insulated enclosure as described herein, and at least one thermal energy converter.

BRIEF DESCRIPTION OF THE DRAWINGS

The present invention will further be described using figures in which like reference numerals refer to the same or similar elements.

DETAILED DESCRIPTION OF THE PREFERRED EMBODIMENTS

Figure 1:
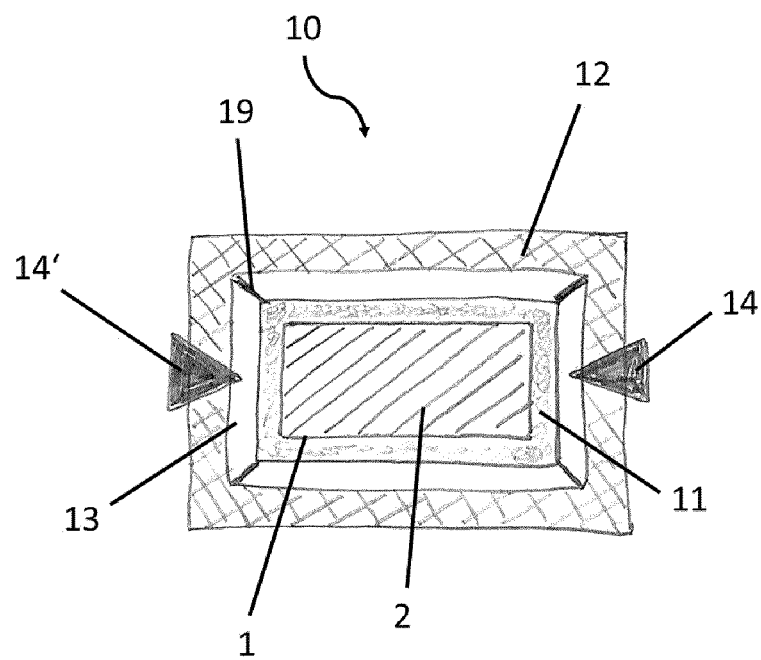
FIG. 1: A thermally insulated enclosure according to the invention.

FIG. 1 shows an embodiment of a thermally insulated enclosure 10 which is a multi-layer insulation, comprising an inner wall 11, an outer wall 12, and an inner void 13 in between. The inner wall 11 is mounted at the outer wall 12 using mounting suspension 19 and defines a cavity 1 containing thermal energy storage material 2. The inner void 13 is connected to the environment of the thermally insulated enclosure 10 via flow regulators 14 and 14' which, in the present embodiment, are arranged on opposite sides of the thermal energy storage material 2.

Figure 2:
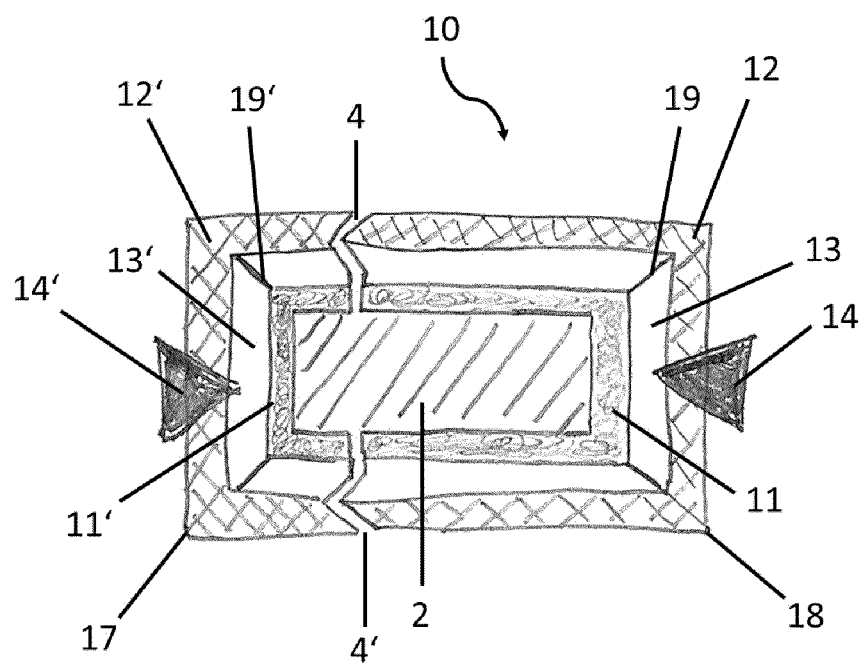
FIG. 2: Another embodiment of a thermally insulated enclosure according to the invention comprising multiple movable parts.

FIG. 2 shows another embodiment of a thermally insulated enclosure 10 according to the invention comprising parts 17 and 18. Each part 17, 18 comprises an inner wall 11, 11', an outer wall 12, 12', and an inner void 13, 13' between the respective inner and outer walls as well as a flow regulator 14, 14'. Similar to the example described in FIG. 1, the respective parts 17, 18 comprise fixating elements 19, 19' connecting the inner walls 11, 11' to the outer walls 12, 12'. The inner walls 11, 11' each define a half cavity which when mated together contains a thermal energy storage material 2. In the present example, the first part 17 can be moved relative to the second part 18, for example by manually operated mechanical devices such as screws, expanding seals, springs or by mechanical devices, motors, pressurization or the like. By moving the two parts 17, 18 relative to each other, two gaps 4, 4' are created in the multilayer insulation 10 through which thermal energy can escape from the cavity of the thermally insulated enclosure 10. Each flow regulator 14, 14' can be used to supply and remove a working fluid (not shown) to and from the respective inner voids 13, 13'.

Figure 3:
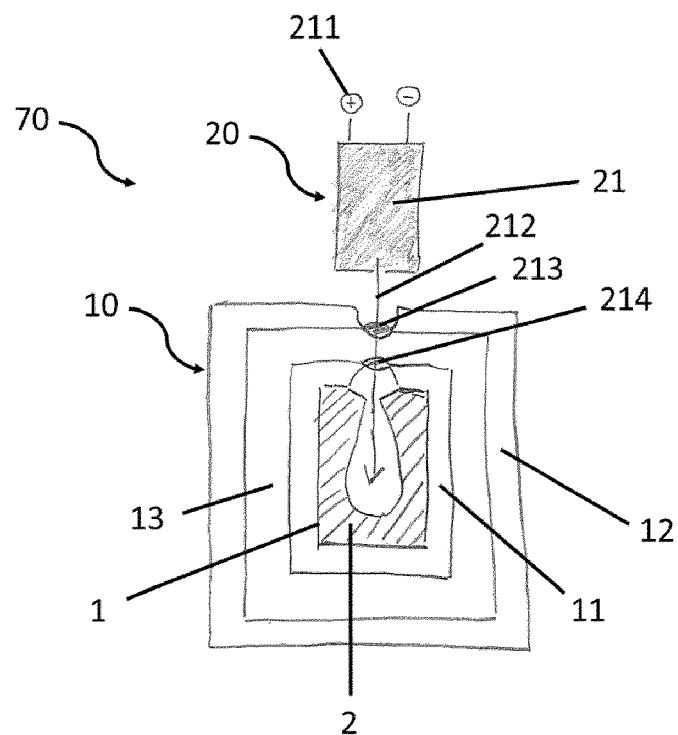
FIG. 3: An arrangement of a laser energy source and a thermal energy storage material in a thermally insulated enclosure.

FIG. 3 shows an arrangement 70 of a laser 21 energy source 20 and a thermal energy storage material 2 contained in a thermally insulated enclosure 10. The energy source 20 comprises a power supply unit 211 for powering a laser 21. For contactless charging of the thermal energy storage material 2, the enclosure 10 features optical passages in the form of windows or optical lenses 213, 214 on the outer wall 12 and inner wall 11 of the thermally insulated enclosure 10. The optical passages are arranged coaxially, thus allowing a laser beam 212 to pass through the housing and into the heat accumulator, as indicated by the marked arrow in FIG. 3.

Figure 4:
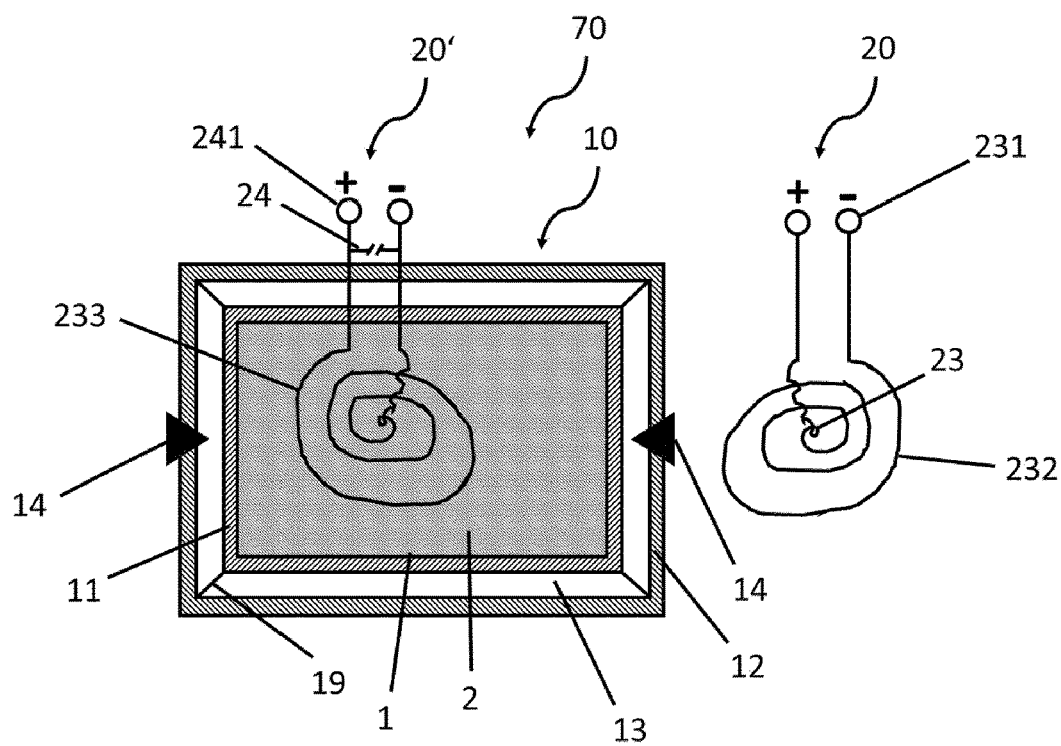
FIG. 4: An arrangement of an induction heating energy source and a thermal energy storage material.

FIG. 4 shows an arrangement 70 of an induction heating 23 energy source 20 and a thermal energy storage material 2 enclosed in a thermally insulated enclosure 10 as described in FIG. 1. In this embodiment, a transmitter coil 232 of the induction heating element 23 is arranged outside the thermally insulated enclosure 10 and connected to a power supply unit 231. A receiver coil 233 is embedded in the thermal energy storage material 2 which allows for contactless heating of the thermal energy storage material 2. In addition, the receiver coil 233 is connected to a second power supply unit 241 and thus also represents an electrical resistance heating element 24. Depending on the available infrastructure, the thermal energy storage material 2 can thus be heated by induction or by direct connection to a power source. In this embodiment the thermally insulated enclosure 10 is configured such that a working fluid (not shown) can be introduced into the inner void 13 via one or both flow regulators 14. The working fluid can be heated by the thermal energy storage material 2 or indirectly via the inner wall 11, which is in contact with the thermal energy storage material 2, and subsequently be removed from the inner void 13 either actively, e.g. by pumping it out of the inner void 13, or passively, e.g. by the automatic opening an appropriately configured overpressure valve.

Figure 5:
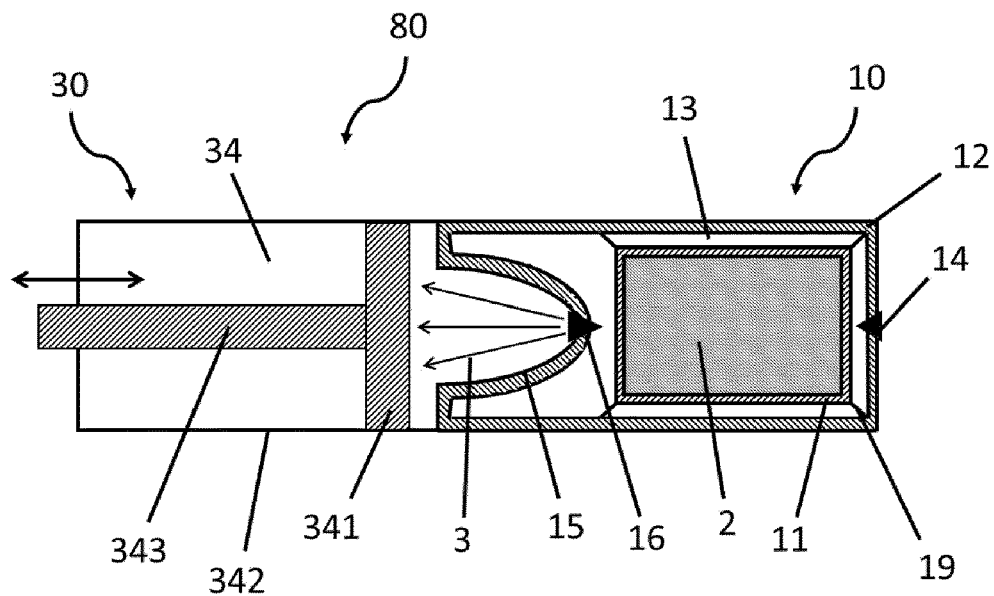
FIG. 5: An arrangement of a thermal energy storage material and a thermal energy converter.

FIG. 5 shows an arrangement 80 of a thermal energy storage material 2 and a thermal energy converter 30 which, in the present example, is a piston engine 34. The piston engine 34 comprises a piston 341 with a piston rod 343, which is movably mounted in a cylinder 342. In the embodiment shown in FIG. 5, the thermal energy storage material 2 is arranged in a thermally insulated enclosure 10, whereby the outer wall 12 of the enclosure 10 on the side facing the piston engine 34 is shaped as a nozzle 15 with a nozzle outlet opening 16. A working fluid 3 can be introduced and heated via the valve 14 into the inner void 13 between the inner wall 11 and the outer wall 12. Due to the temperature increase, the working fluid 3 expands in the inner void 13. The pressure that builds up can subsequently be discharged abruptly into the space above piston 341 by opening the nozzle outlet 16, for example a suitably designed valve, thereby moving piston 341. The piston movement can then be used, for example, to drive a vehicle and/or to generate electricity.

Figure 6:
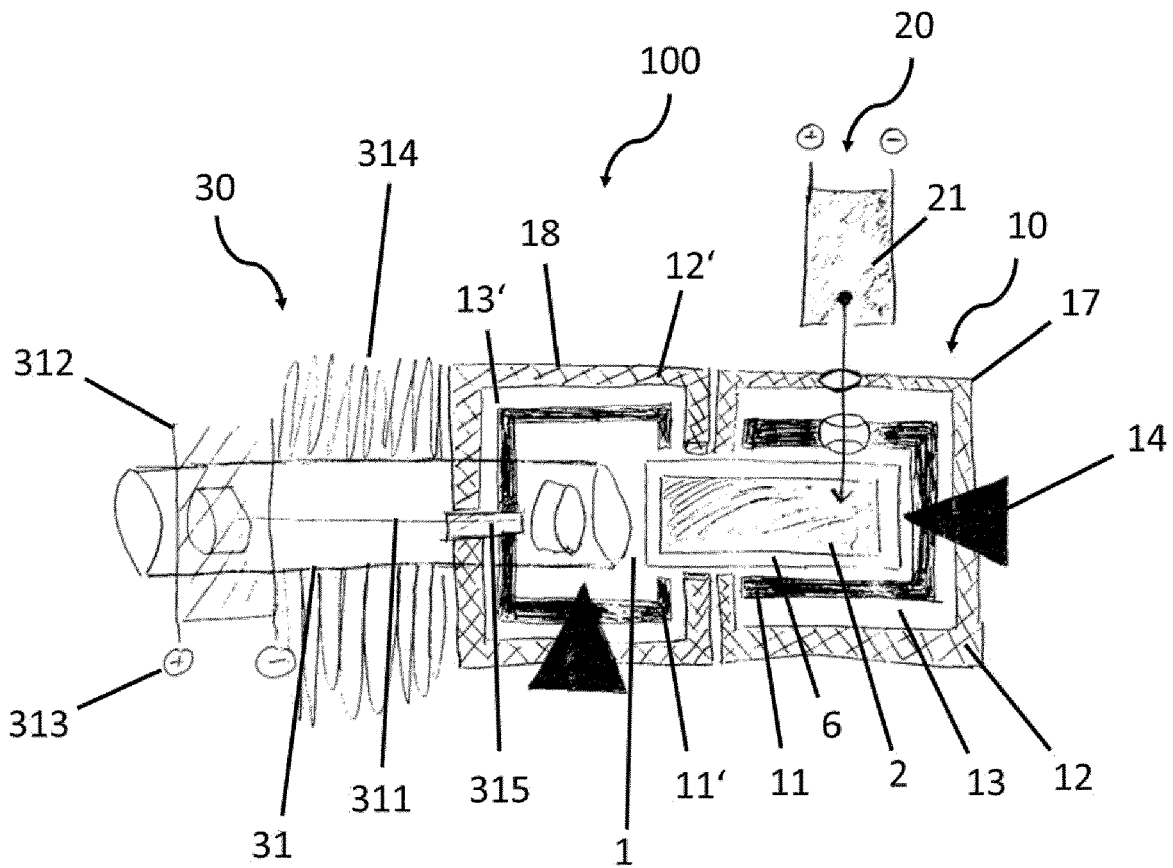
FIG. 6: A device for receiving, storing and releasing thermal energy according to the invention.

FIG. 6 shows a device 100 for receiving, storing and releasing thermal energy according to the invention. The device 100 comprises a thermally insulated enclosure 10 with a first part 17 and a second part 18 creating a cavity for a thermal energy storage material 2 when mated together as illustrated in FIG. 6. This way, the thermal energy storage material 2 can be replaced by taking the first part 17 and the second part 18 apart. Furthermore, the thermal energy storage material 2 can be movable inside the thermally insulated enclosure 10 and comprise a radiation brake 6 which at least partially surrounds the thermal energy storage material 2 to protect it against excessive heat flow. The device 100 further comprises an energy source 20 in the form of a laser 21. The thermal energy storage material 2 can be charged with thermal energy by the laser light through the openings in the enclosure 10. The device 100 further comprises a thermal energy converter 30 which, in the present example, is a Stirling engine 31 configured for receiving thermal energy from the thermal energy storage material 2 and converting at least part of this thermal energy into electricity. Both the first part 17 and the second part 18 of the thermally insulated enclosure 10 comprise an inner wall 11, 11', an outer wall 12, 12' and a substantially gas-tight interior void 13, 13' delimited by the inner wall 11, 11' and the outer wall 12, 12'. The outer walls 12, 12' each comprise one flow regulator 14, 14' for supplying and removing a working fluid (not shown) from the outside of the thermally insulated enclosure 10 to inner voids 13, 13'. In the example shown in FIG. 6, the flow regulators 14, 14' are each additionally configured for directly supplying and/or removing a working fluid from the outside of the thermally insulated enclosure 10 to the cavity 1. The Stirling engine 31 comprises a movable Stirling piston system 311 and a linear current generator 312. A piston rod seal 315 is provided to seal the movable piston rod 311. The current can be tapped at current draw 313. A heat sink 314 is also provided in the device 100.

Figure 7:
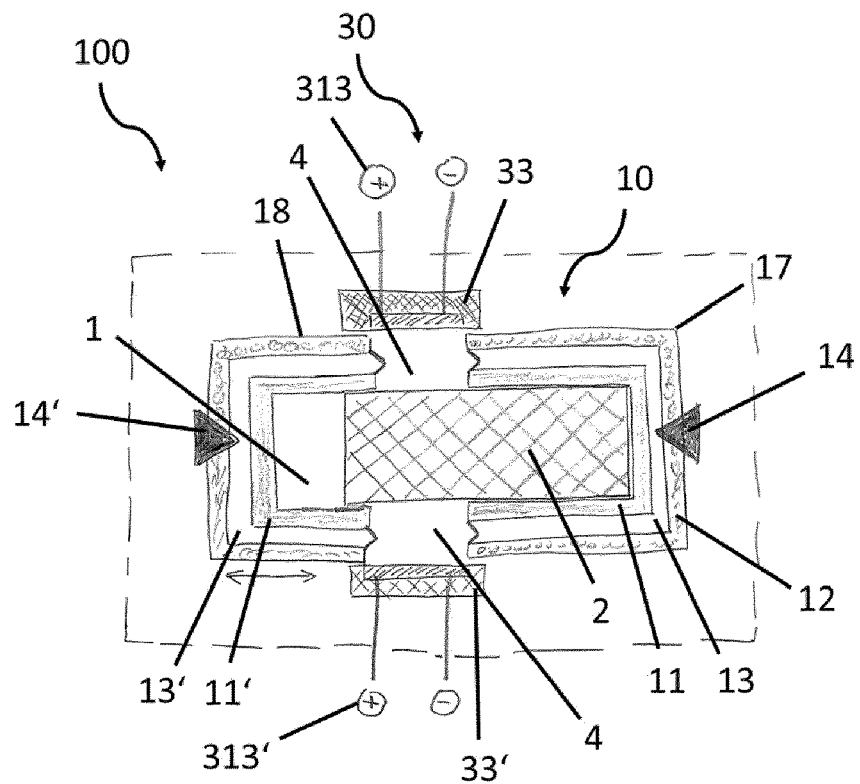
FIG. 7: Another embodiment of a device for receiving, storing and releasing thermal energy.

FIG. 7 shows another embodiment of a device 100 for receiving, storing and releasing thermal energy. In this embodiment, the device 100 essentially comprises the thermally insulated enclosure described in FIG. 2, wherein the mounting suspension 19 and the energy source are both omitted for clarity. The device 100 further comprises two thermal energy converters 30, i.e. thermoelectric generators 33, 33' which are arranged on opposite sides of the thermally insulated enclosure 10. Each thermoelectric generator 33, 33' is arranged in the area of an opening 4 in the enclosure 10 which can be opened and closed by moving part 18 of the thermally insulated enclosure 10 along the indicated arrow. The electricity thus generated can be extracted from the device 100 via units 313 and 313', respectively.

Figure 8:
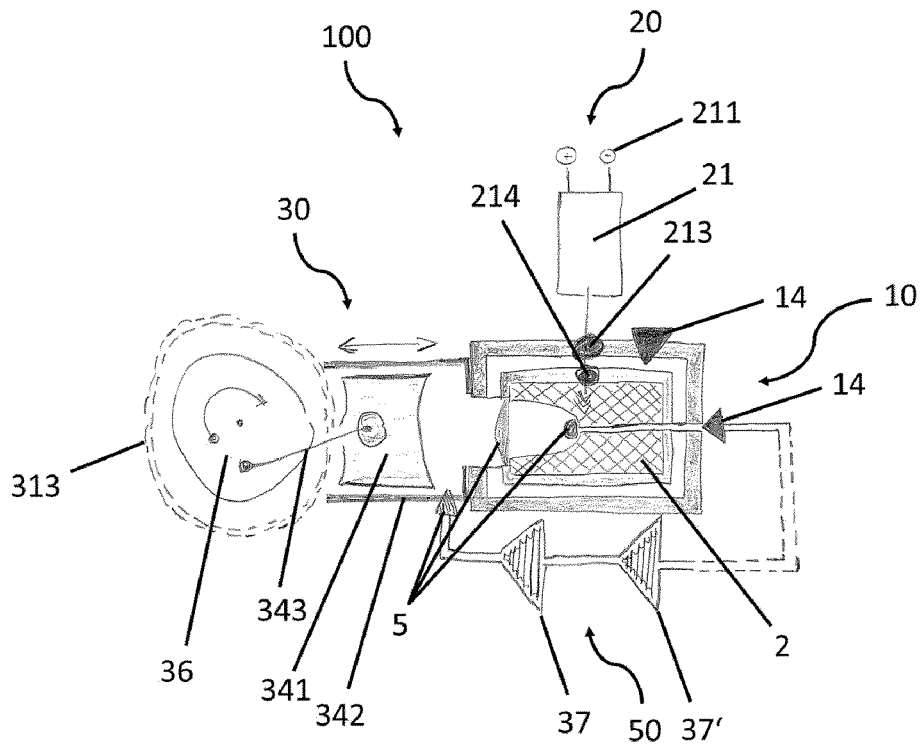
FIG. 8: Another embodiment of a device for receiving, storing and releasing thermal energy.

FIG. 8 shows another embodiment of a device 100 for receiving, storing and releasing thermal energy. In this embodiment, the device 100 comprises an energy source 20, i.e. a laser 21 with power supply unit 211, a thermally insulated enclosure 10, a thermal energy converter 30, i.e. a rotor power generator 36, and a heat recovery device 50, i.e. two turbine power generators 37, 37'. In this embodiment, the thermally insulated enclosure 10 comprising thermal energy storage material 2 is mounted in an essentially pressure-tight manner on top of a cylinder 342 of the rotor power generator 36, wherein the cylinder 342 comprises a high-temperature valve 5 for forming and releasing piston pressure. The translatory movement of piston 341 is transferred into a rotary movement via piston rod 343 and the current is drawn by current collector 313.

The invention claimed is:

1. A device for receiving, storing and releasing thermal energy, the device comprising:
 a thermally insulated enclosure defining a cavity;
 at least one thermal energy storage material disposed within said cavity;
 at least one energy source configured for charging said thermal energy storage material with thermal energy, the energy source comprising an induction heating device with at least one induction coil, wherein the induction coil is connected in a thermally conductive manner to the thermal energy storage material; and
 a thermal energy converter configured for receiving thermal energy from said thermal energy storage material;
 wherein said thermally insulated enclosure comprises an inner wall, an outer wall and a substantially gas-tight interior void delimited by the inner wall and the outer wall,
 wherein the outer wall comprises at least one flow regulator in fluid communication with the interior void and configured to supply and remove working fluids to and from the interior void.

2. The device according to claim 1, wherein the outer wall comprises a first flow regulator and a second flow regulator, wherein the first flow regulator is configured to control the supply of working fluids to and from the interior void to the thermal energy converter and wherein the second flow regulator is configured to supply and remove at least one working fluid to and from the interior void.

3. The device according to claim 1, wherein the inner wall comprises at least one flow regulator in fluid communication with the cavity comprising the thermal energy storage material and configured to supply and remove at least one working fluid to and from the cavity.

4. The device according to claim 3, wherein the thermally insulated enclosure is configured as a nozzle with at least one nozzle outlet opening, wherein the working fluid heated in at least one of the interior void or the cavity leaves the nozzle outlet opening as a jet directed onto the thermal energy converter.

5. The device according to claim 1, wherein the thermally insulated enclosure comprises two parts, wherein the cavity formed when the two parts are mated together is configured to contain the thermal energy storage material therein, and wherein the thermal energy storage material can be replaced by taking the first part and the second part apart.

6. The device according to claim 5, wherein at least one of the first part and the second part is movable between a first position and a second position and configured to form a thermal valve, wherein the thermal valve substantially prevents the transfer of thermal energy from the thermal storage material to the thermal energy converter in the first position, and wherein the thermal valve enables the transfer of thermal energy from the thermal storage material to the thermal energy converter in the second position.

7. The device according to claim 1, wherein said thermal energy storage material comprises one or more static heat storage materials, selected from the group consisting of metals, minerals and ceramics.

8. The device according to claim 1, wherein said thermal energy storage material consists of or comprises a catalyst for a chemical reaction of the working fluid for the dissociation of water into its constituent parts.

9. The device according to claim 1, wherein at least a portion of the thermal energy delivered to the thermal energy converter is converted to electricity by the thermal energy converter by a Stirling engine, a thermoacoustic generator, a thermoelectric generator, a rotor power generator, a peltier element, or an upconverter for solar cells.

10. The device according to claim 1, wherein the thermal energy converter comprises at least one of a piston engine or a fuel cell, wherein at least one of the piston engine or the fuel cell are operated substantially with at least one of oxygen or hydrogen obtained from water splitting using the thermal energy storage material.

11. A method for use with a device of claim 1, the method comprising the steps of:
  receiving, by a thermal energy storage material, thermal energy from the induction heating device;
  heating of a working fluid by the thermal energy storage material;
  transferring, by a working fluid, the thermal energy from the thermal energy storage material to a thermal energy converter; and
  converting, by the thermal energy converter, the thermal energy into at least one of electrical energy or kinetic energy;
  wherein the amount of at least one of electrical energy or kinetic energy generated per unit of time is sufficient to drive a vehicle and wherein the electrical energy does not have to be stored temporarily for this purpose.

* * * * *